United States Patent
Rajagopal

(10) Patent No.: US 8,887,062 B2
(45) Date of Patent: Nov. 11, 2014

(54) WEB COMMAND PROMPT

(75) Inventor: Vinodh Kumar Rajagopal, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 140 days.

(21) Appl. No.: 13/597,151

(22) Filed: Aug. 28, 2012

(65) Prior Publication Data

US 2013/0117683 A1 May 9, 2013

Related U.S. Application Data

(60) Provisional application No. 61/555,248, filed on Nov. 3, 2011.

(51) Int. Cl.
*G06F 3/00* (2006.01)
*G06F 17/27* (2006.01)

(52) U.S. Cl.
CPC .................................. *G06F 17/2705* (2013.01)
USPC ......................................................... 715/745

(58) Field of Classification Search
CPC ..................... G06F 17/30864; G06F 17/30867
USPC ......................................................... 715/745
See application file for complete search history.

(56) References Cited

U.S. PATENT DOCUMENTS 8,645,825 B1 *  2/2014  Cornea et al. .................. 715/257
2007/0118514 A1 *  5/2007  Mariappan ........................ 707/3

* cited by examiner

*Primary Examiner* — Omar Abdul-Ali
(74) *Attorney, Agent, or Firm* — Haynes Beffel & Wolfeld LLP; Ernest J. Beffel, Jr.

(57) ABSTRACT

A method of streamlined web site navigation includes providing a command line interface supplemental to a graphic user interface. The command line interface accepts entry of verbs and parameters from a web site-specific vocabulary. The web site-specific vocabulary allows a user to access functions of a graphic user interface page of the web site by entering at least one verb and without navigating page links to reach the graphic user interface page. The method receives data entered at the command line interface, including the at least one verb. The method continues with identifying a particular web page responsive to the verb, and sending the particular web page towards a client system. The method may further include receiving with the data entered at the command line interface at least one parameter that modifies the verb, and identifying the particular web page responsive to the verb combined with the parameter.

21 Claims, 4 Drawing Sheets

WEB COMMAND PROMPT

RELATED APPLICATION

This application claims the benefit of U.S. Provisional Patent Application No. 61/555,248, entitled, "Web Command Prompt," by Vinodh Rajagopal, filed on 3 Nov. 2011. The provisional application is hereby incorporated by reference for all purposes.

BACKGROUND

The present technology relates to web site navigation. In particular, it relates to web site navigation supplemental to a graphical user interface.

In a web environment with a graphical user interface, a user typically browses multiple web pages and clicks on multiple controls in order to input data, to manipulate data, to view documents, to print documents, etc. It is not efficient to perform such repetitive tasks using a graphical user interface. For example, in order to create a new web page, a user may need to navigate multiple web pages in a web building tool, and click on many controls, before entering any data specific to the user. For another example, in order to print a document using a graphical user interface, a user may need to open a file, set up parameters such as paper size, paper source, orientation, margins, scaling, centering, etc, press OK multiple times, and press close at least once. To print ten documents, the user may need to repeat the same procedure for each document.

An opportunity arises to provide an efficient user interface that does not require users of a server based web site to click various controls to input data into a web page or to perform other repetitive tasks on the web site.

SUMMARY

In one implementation, a method of streamlined web site navigation includes providing a command line interface supplemental to a graphic user interface. The command line interface accepts entry of verbs and parameters from a web site-specific vocabulary. The web site-specific vocabulary allows a user to access functions of a graphic user interface page of the web site by entering at least one verb and without navigating page links to reach the graphic user interface page. The method receives data entered at the command line interface, including the at least one verb. The method continues with identifying a particular web page responsive to the verb, and sending the particular web page towards a client system. The method may further include receiving with the data entered at the command line interface at least one parameter that modifies the verb, and identifying the particular web page responsive to the verb combined with the parameter.

Particular aspects of the technology disclosed are described in the claims, specification and drawings.

DETAILED DESCRIPTION

The following detailed description is made with reference to the figures. Examples are described to illustrate the present technology, not to limit its scope, which is defined by the claims. Those of ordinary skill in the art will recognize a variety of equivalent variations on the description that follows.

Technology is described herein for streamlined web site navigation. The technology described provides a command line interface. The command line interface accepts entry of verbs and parameters that can be specified in a web-site-specific vocabulary. The web-site-specific vocabulary allows a user to access functions of a GUI interface page of the web site by entering at least one verb and without navigating page links to reach the GUI interface page.

In the present technology, a verb specifies an action. A verb may also be a custom verb. A verb or a custom verb may be modified by one or more parameters. This use of "verb" does not refer to its part of speech in the English language or any other natural languages. Verbs can be specific to web site applications or can apply across the web site. Some generally used verbs, such as "LIST" may access different web pages depending on one or more parameters that modify the verb's action.

Figure 1:
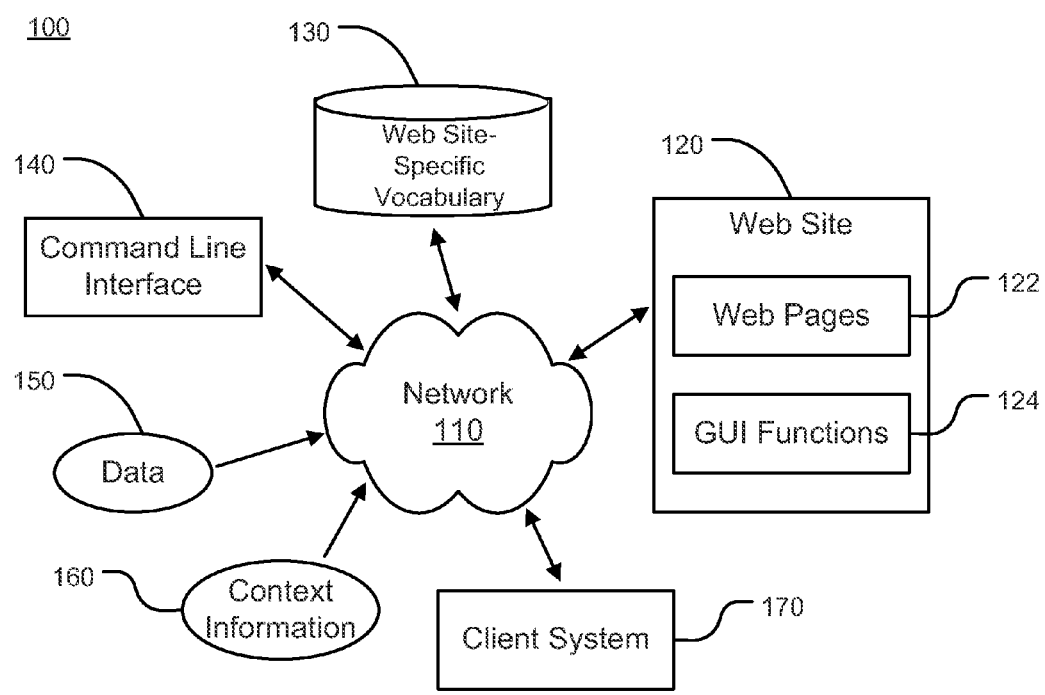
FIG. 1 is a block diagram of an example environment in which a command line interface can be used.

FIG. 1 is a block diagram of an example web environment 100 in which a command line interface can be used. The web environment 100 includes a web site 120, a web site-specific vocabulary 130, a command line interface 140, data 150, context information 160, and a client system 170. The web site 120 includes web pages 122 and GUI (graphic user interface) functions 124. The web environment 100 also includes a communication network 110 that provides communication between various components of the web environment 100.

The command line interface 140 interacts with other components in the web environment 100. The command line interface 140 is local to a web server hosting the particular web site 120. The command line interface 140 is provided by the web server on web pages of the particular web site 120, and is available on any local computing device of the client system 170 on which the web server operates. FIG. 1 illustrates one client system 170, while multiple client systems 170 may be on the communication network 110 in the web environment 100. A front-end of the command line interface 140 may be implemented in a scripting language such as JavaScript, or a programming language such as C#. The web site-specific vocabulary 130 may be implemented with a list of verbs and a list of acceptable parameters for each verb in the list of verbs.

During operation, the command line interface 140 receives data 150 as a stream of character strings separated by delimiters such as spaces, commas, etc, and parses them into tokens that may represent verbs, custom verbs, or parameters. Syntax for commands at the command line interface 140 may vary with web servers and even with verbs supported by each web server. Sample syntax used in the present application is for illustration purposes only.

The command line interface 140 accepts entry of verbs and parameters that can be specified in the web site-specific vocabulary 130. The web site-specific vocabulary 130 allows a user to access functions 124 of a GUI interface page of the web site 120 by entering at least one verb and without navigating page links to reach the GUI interface page.

The command line interface 140 may accept abbreviations for the verbs and/or parameters specified in the web site-specific vocabulary 130. For instance, verb "LIST" may be abbreviated as "LS", verb "PRINT" may be abbreviated as "PR".

The command line interface 140 may auto-complete a verb before it is fully entered. For instance, after a user enters "LI", the command line interface 140 may auto-complete it with "ST" for "LIST" to simplify data entry. Auto-completion may be based on verbs specified in the web site-specific vocabulary 130, or on recently accessed objects. For instance, after the auto-completion of "LIST", the user enters "acc", the command line interface 140 may auto-complete it with "ounts" for "LIST accounts" because the user has a recent history of entering "LIST accounts" at the command line interface 140.

The data 150 is received at the command line interface 140, and includes at least one verb. A particular web page 122 is identified in response to the verb, and the identified particular web page 122 is sent towards a client system 170. In one implementation, the particular web page 122 may be identified in response to at least one verb combined with at least one parameter that modifies the verb. In another implementation, the particular web page 122 may be identified in response to at least one verb combined with context information 160 that was not entered at the command line interface 140.

Figure 2:
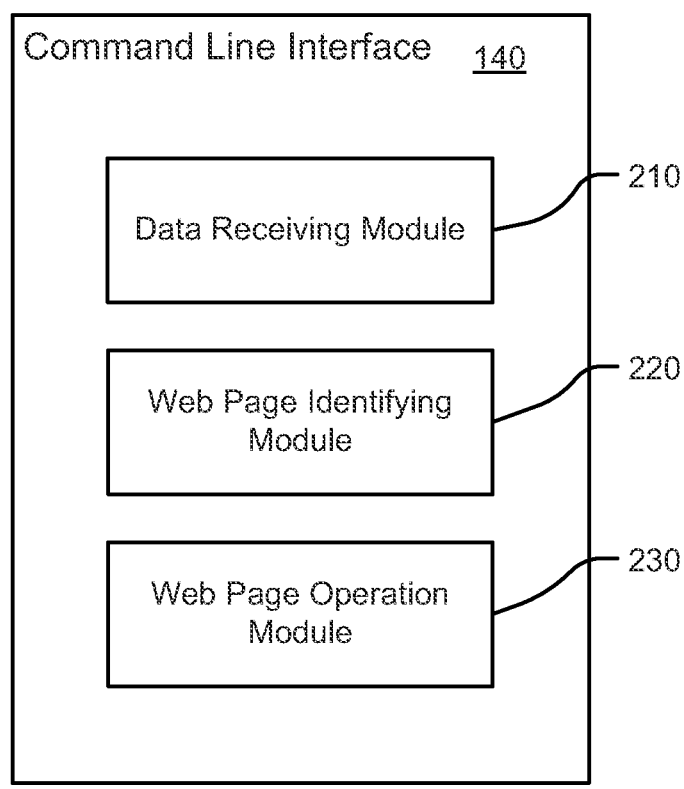
FIG. 2 is a block diagram of example modules associated with the command line interface.

FIG. 2 is a block diagram of example modules associated with the command line interface 140. The command line interface 140 includes a data receiving module 210, a web page identifying module 220, and a web page operation module 230. Some implementations may have different and/or additional modules than those shown in FIG. 2. Moreover, the functionalities can be distributed among the modules in a different manner than described herein.

The data receiving module 210 receives data 150 entered at the command line interface 140. Data may be entered at a user computing device coupled to the client system 170, such as a smartphone, a tablet, a laptop or a desktop computer. The data 150 as entered may include character strings, numbers, key-value pairs or in other formats. The data receiving module 210 then parses the data 150 into standard verbs specified in the web site-specific vocabulary 130, custom verbs, and/or parameters that modify actions of the standard verbs or custom verbs. The data receiving module 210 may issue error messages if the data entered is not parseable due to syntax errors, if a particular verb cannot be modified by a particular parameter as entered, or if there are other conditions that prevent further processing based on the data entered. The data receiving module 210 may discard parts of the data 150 that are not parseable, proceed with other parts of the data 150 that includes at least one verb, and optionally issue a warning message on the discarded parts.

The web page identifying module 220 identifies a particular web page in response to the data 150 entered at the command line interface 140. The data 150 may include standard verbs from the web site-specific vocabulary 130, custom verbs, and/or parameters that modify actions of the standard verbs or custom verbs. Depending on specifics of the data, the web page identifying module 220 may identify a particular web page 122 in response to at least one verb, in response to at least one verb combined with at least one parameter that modifies the verb, in response to at least one verb combined with context information 160 that was not entered at the command line interface 140, or in response to at least one verb combined with at least one parameter that modifies the verb and combined with context information 160 that was not entered at the command line interface 140.

The web page operation module 230 sends the particular web page 122 towards a client system 170. In some implementations, before sending the particular web page, the web page operation module 230 may pre-populate at least one field of the particular web page 122 in response to a parameter that modifies a verb in the data 150. To pre-populate a field of a web page is to automatically generate or fill-in one or more values for the field before the particular web page 122 is sent to the client system 170.

For instance, the particular web page 122 may contain a profile about a user, and some information about the profile is entered at the command line interface 140 as one or more parameters. The information entered may be last name, city and state, as three parameters. The web page operation module 230 may pre-populate last name, city and state fields of the particular web page 122 in response to the last name, city and state parameters, before sending the particular web page 122 to the client system 170. The particular web page 122 may contain more fields that are not pre-populated, such as first name, middle initial, street address, and zip code. Those fields may be filled later at the command line interface 140, or on a graphic user interface page.

Responsive to a custom verb and a parameter that modifies the custom verb, the web page operation module 230 may perform one or more operations supported by the web site 120 without transmitting corresponding operations pages, before sending the particular web page. The one or more operations may use GUI functions 124 supported at the web site 120. For instance, the custom verb may be "CALC" and the parameter may be "expenses". In response, the web page operation module 230 may perform an expense calculation operation using a corresponding operation page without transmitting the corresponding operation page.

Figure 3:
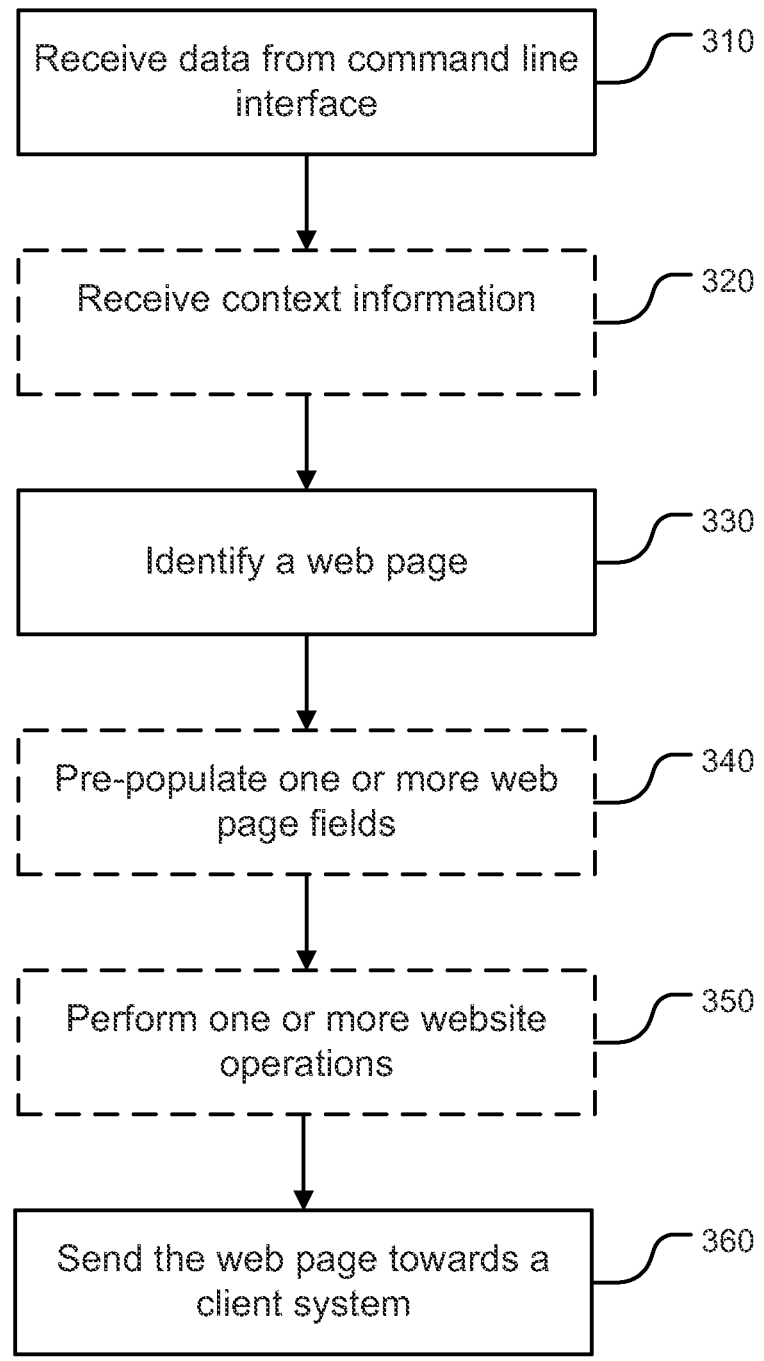
FIG. 3 is a high-level flow chart for a method of streamlined web site navigation.

FIG. 3 is a high-level flow chart for a method of streamlined web site navigation. The method includes providing a command line interface 140 supplemental to a graphic user interface. The command line interface 140 accepts entry of verbs and parameters from a web site-specific vocabulary 130. The web site-specific vocabulary 130 allows a user to access functions 124 of a graphic user interface page of the web site 120 by entering at least one verb and without navigating page links to reach the graphic user interface page.

Actions 310-360 can be combined in a variety of ways and expressed in a variety of methods. For instance, action 350 may be executed before action 340 such that results from performing one or more website operations can be pre-populated with one or more web page fields.

With action 310, the method receives data 150 entered at the command line interface 140, including at least one verb. With action 330, the method identifies a particular web page 122 responsive to the verb. With action 360, the method sends the particular web page 122 toward a client system 170. For instance, the data 150 received at the command line interface 140 may include exactly one verb "WHO", which may be from the web site-specific vocabulary 130. In response to the verb "WHO", the method may identify a particular web page 122 which is the home page of a user currently logged on to the web site. The home page of the user may include such information as first name, last name, employer, job title, public profile, personal website, email, etc. The method then sends the identified particular web page 122 to the client system 170.

Depending on design criteria for each particular web server, verbs such as the verb "WHO" may be case-sensitive or case-insensitive. If verbs are case-insensitive, "WHO", "who", "Who", etc. have the same effect at the command line interface 140. If verbs are case-sensitive, "WHO", "who", "Who", etc. have different effects at the command line interface 140. For convenience of description, verbs are assumed to be case-insensitive in the present application.

These and additional implementations can include one or more of the following features. In one implementation, with action 310, the method receives with the data 150 entered at the command line interface 140 at least one parameter that modifies the verb, and with action 330, the method identifies the particular web page responsive to the verb combined with the parameter. For instance, the data 150 received at the command line interface 140 may include one verb "LIST" with one parameter <entity name>. The verb "LIST" may be specified in the web site-specific vocabulary 130. An example syntax for the command may be:

LIST<entity name> where the <entity name> indicates that an actual entity name is to follow the verb "LIST". In response to the verb combined with the parameter, the method may identify a particular web page 122 associated with an entity with the <entity name>. The method then sends the identified particular web page 122 to the client system 170. For instance, the entity may be accounts, which are associated with multiple objects such as various reports and various tools. The identified particular web page 122 may include information about the reports and tools in the accounts. The verb "LIST" may accept two or more parameters:

LIST<entity name 1>, <entity name 2>, <entity name 3> where three entity names are provided for the verb "LIST". In response to the verb combined with the parameters, the method may identify multiple particular web pages 122 associated with the entities. The method then sends the identified particular web pages 122 to the client system 170. The identified particular web page 122 may include information about objects in the entities.

In another implementation, with action 310, the method receives with the data 150 entered at the command line interface 140 at least one parameter that modifies the verb, and with action 340, the method pre-populates at least one field of the particular web page 122, responsive to the parameter, before sending the particular web page 122.

For instance, the data 150 received at the command line interface 140 may include one verb "NEW" with optional multiple parameters for creating one or more web pages. An example syntax for the command may be:

NEW, <title>, <body> and a user may enter:

NEW "Idea", "Change the World", "One Web Site at a Time"

In response to the verb combined with the parameters, the method may create a particular web page 122, pre-populate the particular web page 122 with the page type "Idea", the title "Change the World", and the body "One Web Site at a Time", before sending the particular web pages 122 to the client system 170.

As another example, the data 150 received at the command line interface 140 may include one verb "PROF" with multiple parameters for creating, viewing or editing user profiles. The verb "PROF" may be from the web site-specific vocabulary 130. An example syntax for the command may be:

PROF<user name>, <last name>, <city>, <state> where <user name>, <last name>, <city>, and <state> are entered at the command line interface 140 as parameters for the verb "PROF". If a particular web page 122 containing a profile for an existing user with the <user name> already exists, in response to the verb combined with the parameters, the method identifies the particular web page 122 including the profile of the user, and pre-populates three fields of the particular web page 122 corresponding to the <last name>, <city>, and <state> parameters, before sending the particular web page 122. If a profile for the user does not already exist, in response to the verb combined with the parameters, the method creates a profile in a particular web page 122 for the user, and pre-populates three fields of the particular web page 122 corresponding to the <last name>, <city>, and <state> parameters, before sending the particular web page 122.

In one implementation, wherein the verb is a custom verb, with action 310, the method also receives with the data 150 entered at the command line interface 140 at least one parameter that modifies the custom verb, and with action 350, in response to the custom verb and the parameter, the method performs one or more operations supported by the web site 120 without transmitting corresponding operations pages, before sending the particular web page 122. The one or more operations may use GUI functions 124 supported at the web site 120.

For instance, with action 310, the method receives with the data 150 entered at the command line interface 140 one parameter "expenses" that modifies a custom verb "CALC". With action 350, in response to the custom verb and the parameter, the method identifies a particular web page responsive to the custom verb, and performs an expense calculation operation supported by the web site 120 without transmitting corresponding expense operations pages, before sending the particular web page to at least indicate the expense calculation operation has been performed.

In another implementation, wherein the verb is a custom verb, with action 310, the method receives with the data 150 entered at the command line interface 140 at least one parameter that modifies the custom verb, and with action 340, in response to the custom verb and the parameter, the method pre-populates a plurality of fields of the particular web page 122 before sending the particular web page 122.

For instance, with action 310, the method receives with the data 150 entered at the command line interface 140 a first parameter "expenses" and a second parameter "pop" that modify a custom verb "CALC". With action 350, in response to the custom verb and the parameter "expenses", the method identifies a particular web page responsive to the custom verb, and performs an expense calculation operation supported by the web site 120 without transmitting corresponding expense operations pages. Further, with action 340, in response to the custom verb and the parameter "pop", the method pre-populates a plurality of fields of the particular web page with results of the expense calculation operation from action 350, before sending the particular web page.

In a further implementation, wherein the custom verb specifies operations normally performed by accessing a plurality of GUI interface pages, with action 350, in response to the custom verb, the method further accomplishes at least one initial operation and bypasses access to at least one GUI interface page, before sending the particular web page 122. For instance, a custom verb "PRINT" may accept one or more parameters:

PRINT<object name 1>, <object name 2>, <object name 3> where objects specified by the object names may be multiple files to be printed. Operations of printing multiple files are normally performed by accessing a plurality of graphic user interface pages, and can be repetitive tasks that involve manual browsing and clicking multiple controls in a graphic user interface. Such tasks can be simplified by using the custom verb "PRINT". In response to the custom verb combined with the parameters, the method may first identify multiple particular web pages 122 associated with the multiple objects specified at the command line interface 140. The method may accomplish one initial operation such as adjusting page setup to turn on horizontal and vertical centering, and bypass access to graphics user interface page setup pages for each of the files to be printed, before sending the identified particular web pages 122 to the client system 170 for printing.

In some implementations, with action 320, the method may also receives with the data 150, context information 160 that was not entered at the command line interface 140, and identifies the particular web page 122, responsive to the verb combined with the context information.

For instance, with action 310, the method receives data 150 entered at the command line interface 140, where the data 150 includes one verb "PROF", without specifying any parameters such as a user name. The verb "PROF" may be used for creating, viewing or editing a profile of a user. If a <user name> parameter is specified to modify the verb "PROF", the method may proceed to identify a particular web page 122 including the profile of the user <user name>. If a <user name> parameter is not specified, with action 320, the method receives the user login information at the web site 120 as context information that was not entered at the command line interface 140. With action 330, the method identifies a particular web page 122 including the profile of the user logged in to the web site, responsive to the verb "PROF" combined with the context information about the logged in user from whom the verb "PROF" is received.

Figure 4:
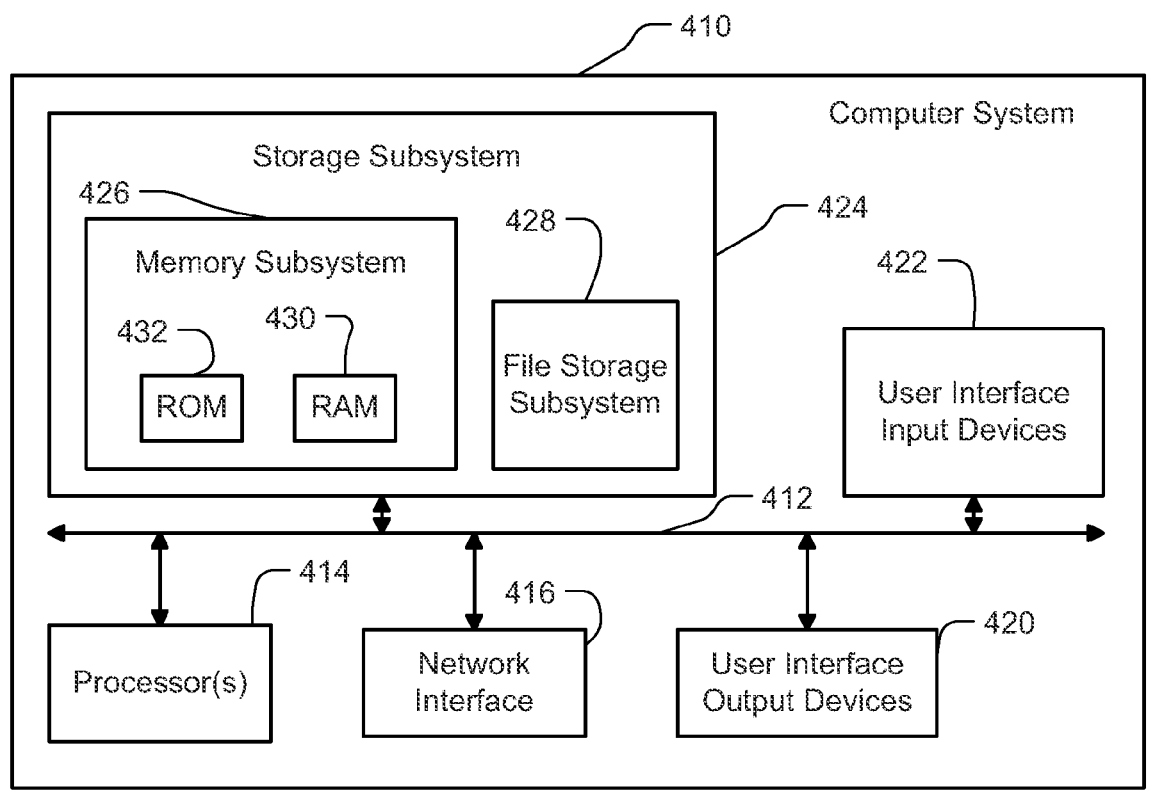
FIG. 4 is a block diagram of an example computer system.

FIG. 4 is a block diagram of an example computer system, according to one implementation. Computer system 410 typically includes at least one processor 414 which communicates with a number of peripheral devices via bus subsystem 412. These peripheral devices may include a storage subsystem 424 including, for example, memory devices and a file storage subsystem, user interface input devices 422, user interface output devices 420, and a network interface subsystem 416. The input and output devices allow user interaction with computer system 410. Network interface subsystem 416 provides an interface to outside networks, including an interface to communication network 110, and is coupled via communication network 110 to corresponding interface devices in other computer systems.

User interface input devices 422 may include a keyboard; pointing devices such as a mouse, trackball, touchpad, or graphics tablet; a scanner; a touchscreen incorporated into the display; audio input devices such as voice recognition systems and microphones; and other types of input devices. In general, use of the term "input device" is intended to include all possible types of devices and ways to input information into computer system 410 or onto communication network 110.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules and methods described herein. These software modules are generally executed by processor 414 alone or in combination with other processors.

Memory 426 used in the storage subsystem can include a number of memories including a main random access memory (RAM) 430 for storage of instructions and data during program execution and a read only memory (ROM) 432 in which fixed instructions are stored. A file storage subsystem 428 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 428 in the storage subsystem 424, or in other machines accessible by the processor.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a one example. Many other configurations of computer system 410 are possible having more or fewer components than the computer system depicted in FIG. 4.

Particular Implementations

One implementation of the technology disclosed is a method of streamlined web site navigation. The method includes providing a command line interface supplemental to a graphic user interface. Applying this method, the command line interface accepts entry of verbs and parameters from a web site-specific vocabulary. The web site-specific vocabulary allows a user to access functions of a graphic user interface page of the web site by entering at least one verb and without navigating page links to reach the graphic user interface page. The method includes receiving data entered at the command line interface, including the at least one verb. The method also includes identifying a particular web page responsive to the verb, and sending the particular web page towards a client system. Additional implementations of the technology disclosed include corresponding systems, apparatus, and computer program products.

These and additional implementations can include one or more of the following features. In some implementations, the method further includes receiving with the data entered at the command line interface at least one parameter that modifies the verb, and identifying the particular web page responsive to the verb combined with the parameter.

A further implementation may include receiving with the data entered at the command line interface at least one parameter that modifies the verb, and pre-populating at least one field of the particular web page, responsive to the verb combined with the parameter, before sending the particular web page.

In one implementation, wherein the verb is a custom verb, the method may further include receiving with the data entered at the command line interface at least one parameter that modifies the custom verb, and responsive to the custom verb and the parameter, performing one or more operations supported by the web site without transmitting corresponding operations pages, before sending the particular web page.

In another implementation, wherein the verb is a custom verb, the method may further include receiving with the data entered at the command line interface at least one parameter that modifies the custom verb, and responsive to the custom verb and the parameter, pre-populating a plurality of fields of the particular web page before sending the particular web page.

In a further implementation, wherein the custom verb specifies operations normally performed by accessing a plurality of GUI interface pages, the method further includes responsive to the custom verb, accomplishing at least one initial operation and bypassing access to at least one GUI interface page, before sending the particular web page.

In yet another implementation, the method further includes receiving with the data context information that was not entered at the command line interface, and identifying the particular web page, responsive to the verb combined with the context information.

As mentioned above, the technology disclosed may be implemented in a computer system for streamlined web site navigation. The computer system includes one or more processor configured to perform operations implementing methods as described herein and any of the features and optional implementations of the methods described.

As mentioned above, the technology disclosed may be implemented in non-transitory computer readable medium storing computer instructions for streamlined web site navigation. The non-transitory computer readable medium includes actions to implement methods as described herein and any of the features and optional implementations of the methods described.

While the present technology is disclosed by reference to the preferred implementations and examples detailed above, it is understood that these examples are intended in an illustrative rather than in a limiting sense. Computer-assisted processing is implicated in the described implementations. Accordingly, the present technology may be embodied in methods for streamlined web site navigation, systems including logic and resources to carry out streamlined web site navigation, systems that take advantage of computer-assisted streamlined web site navigation, media impressed with logic to carry out streamlined web site navigation, data streams impressed with logic to carry out streamlined web site navigation, or computer-accessible services that carry out computer-assisted streamlined web site navigation. It is contemplated that modifications and combinations will readily occur to those skilled in the art, which modifications and combinations will be within the spirit of the technology and the scope of the following claims.

I claim:

1. A method of streamlined web site navigation, including:
   providing a command line interface to a particular web site supplemental to a GUI interface,
      wherein the command line interface accepts entry of verbs and parameters from a web site-specific vocabulary, wherein the verbs and parameters have meaning local to a web server hosting the particular web site,
      wherein the web site-specific vocabulary allows a user to access functions of a GUI interface page of the web site by entering at least one verb and without navigating page links to reach the GUI interface page;
   receiving data entered at the command line interface, including the at least one verb;
   identifying a particular web page responsive to the verb; and
   sending the particular web page towards a client system.

2. The method of claim 1, further including:
   receiving with the data entered at the command line interface at least one parameter that modifies the verb; and
   identifying the particular web page responsive to the verb combined with the parameter.

3. The method of claim 1, further including:
   receiving with the data entered at the command line interface at least one parameter that modifies the verb; and
   pre-populating at least one field of the particular web page, responsive to the verb combined with the parameter, before sending the particular web page.

4. The method of claim 1, wherein the verb is a custom verb, further including:
   receiving with the data entered at the command line interface at least one parameter that modifies the custom verb; and
   responsive to the custom verb and the parameter, performing one or more operations supported by the web site without transmitting corresponding operations pages, before sending the particular web page.

5. The method of claim 1, wherein the verb is a custom verb, further including:
   receiving with the data entered at the command line interface at least one parameter that modifies the custom verb; and
   responsive to the custom verb and the parameter, pre-populating a plurality of fields of the particular web page before sending the particular web page.

6. The method of claim 5, wherein the custom verb specifies operations normally performed by accessing a plurality of GUI interface pages; further including, responsive to the custom verb, accomplishing at least one initial operation and bypassing access to at least one GUI interface page, before sending the particular web page.

7. The method of claim 1, further including:
   receiving with the data context information that was not entered at the command line interface; and
   identifying the particular web page, responsive to the verb combined with the context information.

8. A computer system for streamlined web site navigation, the computer system including one or more processors configured to perform operations including:
   providing a command line interface to a particular web site supplemental to a GUI interface,
      wherein the command line interface accepts entry of verbs and parameters from a web site-specific vocabulary, wherein the verbs and parameters have meaning local to a web server hosting the particular web site,
      wherein the web site-specific vocabulary allows a user to access functions of a GUI interface page of the web site by entering at least one verb and without navigating page links to reach the GUI interface page;
   receiving data entered at the command line interface, including the at least one verb;
   identifying a particular web page responsive to the verb; and
   sending the particular web page towards a client system.

9. The computer system of claim 8, wherein the processors configured to further perform operations including:
   receiving with the data entered at the command line interface at least one parameter that modifies the verb; and
   identifying the particular web page responsive to the verb combined with the parameter.

10. The computer system of claim 8, wherein the processors configured to further perform operations including:
    receiving with the data entered at the command line interface at least one parameter that modifies the verb; and
    pre-populating at least one field of the particular web page, responsive to the verb combined with the parameter, before sending the particular web page.

11. The computer system of claim 8, wherein the verb is a custom verb, wherein the processors configured to further perform operations including:

receiving with the data entered at the command line interface at least one parameter that modifies the custom verb; and responsive to the custom verb and the parameter, performing one or more operations supported by the web site without transmitting corresponding operations pages, before sending the particular web page.

12. The computer system of claim 8, wherein the verb is a custom verb, wherein the processors configured to further perform operations including:

receiving with the data entered at the command line interface at least one parameter that modifies the custom verb; and responsive to the custom verb and the parameter, pre-populating a plurality of fields of the particular web page before sending the particular web page.

13. The computer system of claim 12, wherein the custom verb specifies operations normally performed by accessing a plurality of GUI interface pages; wherein the processors configured to further perform operations including, responsive to the custom verb, accomplishing at least one initial operation and bypassing access to at least one GUI interface page, before sending the particular web page.

14. The computer system of claim 8, wherein the processors configured to further perform operations including:

receiving with the data context information that was not entered at the command line interface; and identifying the particular web page, responsive to the verb combined with the context information.

15. A computer readable storage medium has instructions stored for streamlined web site navigation thereon which, when executed by one or more computers, cause the one or more computers to perform operations including:

providing a command line interface to a particular web site supplemental to a GUI interface,
wherein the command line interface accepts entry of verbs and parameters from a web site-specific vocabulary, wherein the verbs and parameters have meaning local to a web server hosting the particular web site,
wherein the web site-specific vocabulary allows a user to access functions of a GUI interface page of the web site by entering at least one verb and without navigating page links to reach the GUI interface page;

receiving data entered at the command line interface, including the at least one verb;

identifying a particular web page responsive to the verb; and sending the particular web page towards a client system.

16. The computer readable storage medium of claim 15, wherein the operations further including:

receiving with the data entered at the command line interface at least one parameter that modifies the verb; and identifying the particular web page responsive to the verb combined with the parameter.

17. The computer readable storage medium of claim 15, wherein the operations further including:

receiving with the data entered at the command line interface at least one parameter that modifies the verb; and pre-populating at least one field of the particular web page, responsive to the verb combined with the parameter, before sending the particular web page.

18. The computer readable storage medium of claim 15, wherein the verb is a custom verb, wherein the operations further including:

receiving with the data entered at the command line interface at least one parameter that modifies the custom verb; and responsive to the custom verb and the parameter, performing one or more operations supported by the web site without transmitting corresponding operations pages, before sending the particular web page.

19. The computer readable storage medium of claim 15, wherein the verb is a custom verb, wherein the operations further including:

receiving with the data entered at the command line interface at least one parameter that modifies the custom verb; and responsive to the custom verb and the parameter, pre-populating a plurality of fields of the particular web page before sending the particular web page.

20. The computer readable storage medium of claim 19, wherein the custom verb specifies operations normally performed by accessing a plurality of GUI interface pages; wherein the operations further including, responsive to the custom verb, accomplishing at least one initial operation and bypassing access to at least one GUI interface page, before sending the particular web page.

21. The computer readable storage medium of claim 15, wherein the operations further including:

receiving with the data context information that was not entered at the command line interface; and identifying the particular web page, responsive to the verb combined with the context information.

* * * * *